United States Patent [19]

Benton

[11] 4,211,125
[45] Jul. 8, 1980

[54] PLURAL LEAD BALL NUT SCREW ACTUATOR

[75] Inventor: Robert L. Benton, Bay City, Mich.

[73] Assignee: General Motors Corporation, Detroit, Mich.

[21] Appl. No.: 913,869

[22] Filed: Jun. 8, 1978

[51] Int. Cl.$^2$ ............................................. F16H 1/18
[52] U.S. Cl. ............................................. 74/424.8 R
[58] Field of Search .................... 74/459, 424.8 R

[56] References Cited

U.S. PATENT DOCUMENTS

| | | | |
|---|---|---|---|
| 3,170,336 | 2/1965 | Bohnhoff | 74/424.8 R |
| 3,826,153 | 7/1974 | Sheppard | 74/459 |

Primary Examiner—Werner H. Schroeder
Assistant Examiner—Doris L. Troutman
Attorney, Agent, or Firm—Charles R. White

[57] ABSTRACT

Ball nut and screw in which the nut has a ball pickup and return fixture on either end, each providing arcuately spaced ball pickup and returns to and from the spiraling lands associated with plural lead helical ball tracks of the screw. With plural lead ball tracks, increased ball nut travel with at least the same capacity as a single lead ball nut and screw is provided. The ball pickup and return fixtures have ramps and spiraled ball tunnels that provide for the smooth circulation of the separate ball trains of the system.

2 Claims, 4 Drawing Figures

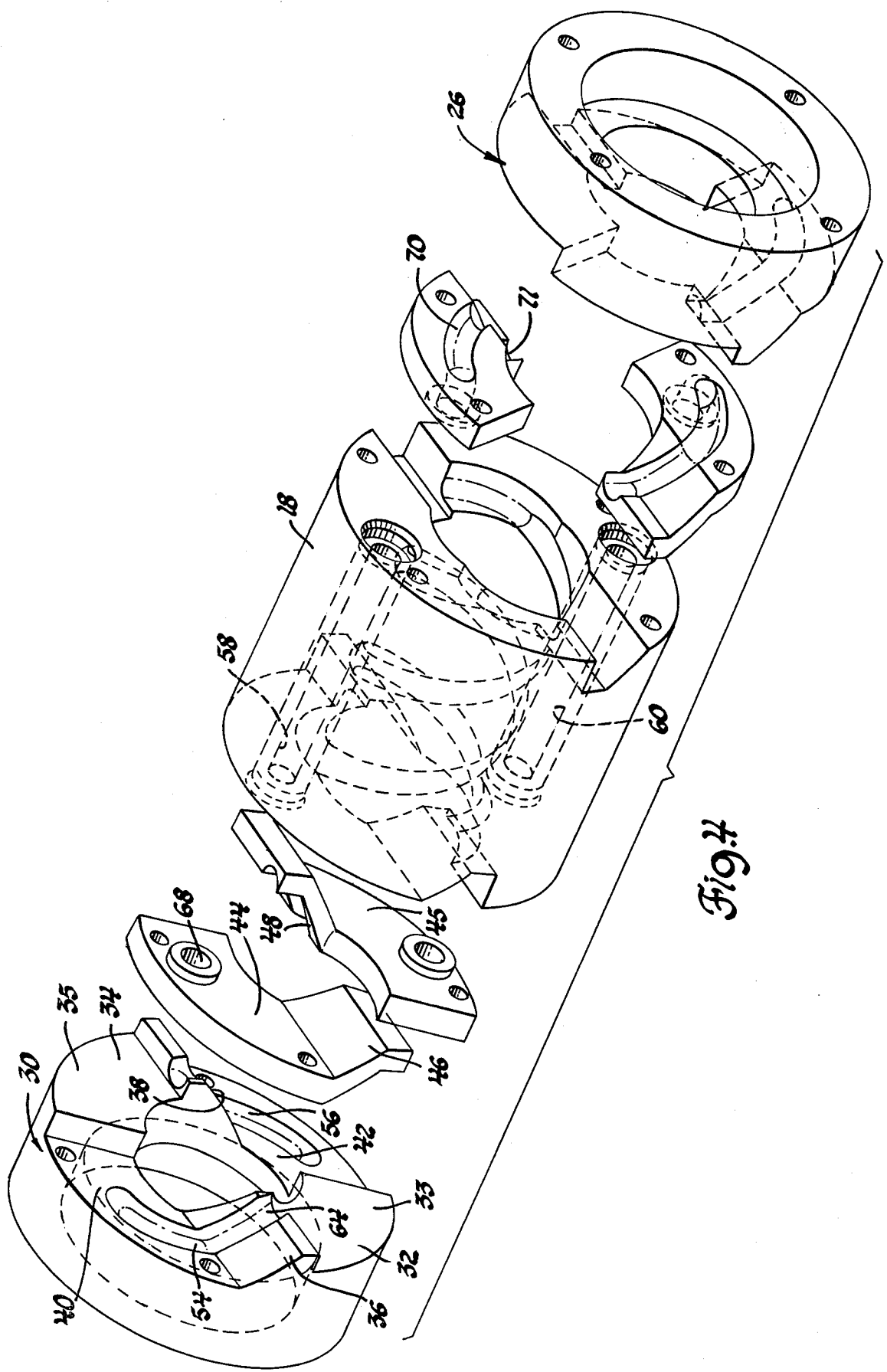

PLURAL LEAD BALL NUT SCREW ACTUATOR

This invention relates to actuators and more particularly to a plural lead ball nut and screw actuator having ntw and improved ball pickup and return assemblies at either end of the nut with ball ramps and spiral tunnels for the smooth pickup and delivery of the balls of plural ball trains working the plural leads.

In many ball nut and screw assemblies means for recirculating the balls of the working train comprise either a return tube or a ball return device secured to the nut having deflector fingers extending into the race formed by the helical groove of the screw and the complementary internal groove of the nut. In another and more specialized ball nut and screw assembly, end plates are provided with pickup fingers which strike the balls in the helical groove to guide the balls in outwardly extending paths during operation. These types of recirculating devices frequently product vibrations and noise which detracts from their uses.

With the foregoing in mind, the present invention provides a ball nut and screw assembly having new and improved ball train recirculating means arranged at each end of the nut. More specifically, the ball nut has ball return fixtures secured to each end thereof provided with special ramps and spiraled passageway means for ball travel between plural lead helical races of ball nut and screw assembly and longitudinal intermediate passages in the nut. Each passageway means is characterized in that it is formed by a tunnel in a guide plate and a deflector plate which starts as an outwardly spiraling tunnel having a ramp which takes the ball away from the land associated with the end turn of the helical races and from the next adjacent groove to allow a plurality of ball trains to be used in this assembly. With the ramp taking the balls away from the load carrying part of the ball nut, a larger number of ball circuits can be provided. With the ramps allowing plural lead screws, ball nut actuators having the same load capacity as an actuator having a single lead is provided. Additionally, with a plural lead screw ball nut length can be reduced while ball nut travel for each revolution of the screw is increased.

It is a feature, object and advantage of this invention to provide a new and improved ball nut and screw actuator having a multi-lead screw, a nut mounted on the screw, a plurality of separate and endless ball trains operatively connecting the nut and screw and end return assemblies at each end of the nut with each return assembly providing a pair of return paths initiating at pickup points on the lands of associated helical races and from the pickup points spiraling outwardly and on ramps to terminal positions connected to a longitudinal return passage interconnecting the end return assemblies.

Another feature, object and advantage of this invention is to provide a new and improved end return assembly with ramped ball pickups for a multi-train ball nut and screw with the pickups being from lands leading each of the helical grooves of the plural path screw of the assembly.

Another feature, object and advantage of this invention is to provide a new and improved multi-lead ball nut and screw actuator in which the ball nut has a ball return fixture for opposite ends thereof and each return assembly has a plurality of ball return paths having a pickup aligned with the land of each helical groove in the screw and each path including a ramp for leading the ball of the associated ball trains axially and spirally away from the next adjacent helical path to maintain the integrity of the separate ball trains and to provide for smooth and vibration-free operation.

These and other features, objects and advantages of this invention will be more apparent from the following detailed description and drawings in which:

FIG. 4 is an exploded perspective view of the ball nut and screw assembly of this invention.

Figure 1:
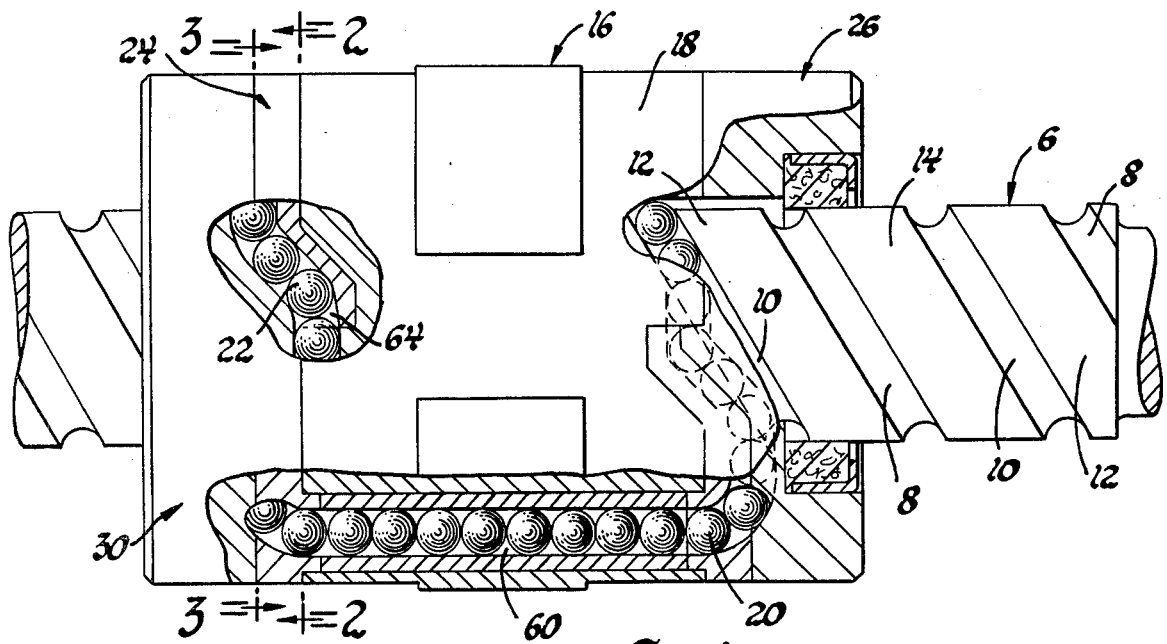
FIG. 1 is a side elevational view partly in section of a ball nut and screw assembly according to this invention.
Figure 2:
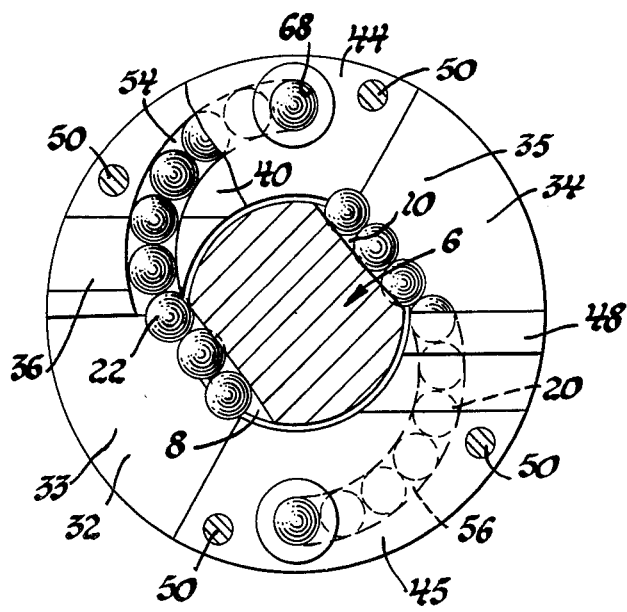
FIG. 2 is a sectional view taken along sight line 2—2 of FIG. 1.

In FIG. 1 an elongated screw 6 is shown with double leads provided by helical grooves 8 and 10 interspaced by helical lands 12 and 14. A ball nut assembly 16 disposed around screw 6 incorporates a cylindrical ball nut body 18 formed with internal helical grooves that complement the grooves 8 and 10 to form a pair of separate helical races for the separate and endless ball trains 20 and 22. These ball trains provide the separate drive connection between the ball nut assembly 16 and the screw 6 so that clockwise rotation of the screw in FIG. 2 will activate the ball train and linearly move the ball nut assembly 16 to the right in FIG. 1 while a counter-clockwise rotation of screw 6 will linearly move the ball nut assembly leftwardly.

At opposite ends of the ball nut body 18 and forming part of the ball nut assembly, are ball return fixtures 24 and 26 which are substantially identical in construction and operation to one another so that only fixture 24 is described in detail. This fixture comprises a deflector plate 30 that is generally toroidal in shape, however, possessing a pair of diametrically-opposed, axially-extending, arcuate segments 32 and 34 having flat, ball-deflecting surfaces 33 and 35. As best shown in FIG. 4, the deflector plate 30 has a pair of ramp portions 36 and 38 which incline respectively from the segments 32 and 34 onto respective arcuate surfaces 40 and 42 axially offset from the flat surfaces 33 and 35. The fixture also has a pair of guide plates 44 and 45 each having an arcuate body portion which fits on and matches the guide surfaces 40 and 42 of the deflector plate. The guide plates also have ramp portions 46 and 48 that match and fit on deflector plate ramp portions 36 and 38 respectively to form a pair of ramps for the ball tunnels described below. Threaded fasteners 50 are employed to secure the ball return fixture 24 comprised of the deflector and guide plates to the body 18 of the ball nut. The guide plate and deflector plates have matching and cooperating grooves in their interface which form outwardly spiraling ball tunnels 54 and 56 for smoothly guiding the associated ball trains 22 and 20 from the lands of the end turns of the separate helical races of the ball nut and screw to the respective intermediate passages 58 and 60 which extend the length of the body of the ball nut. The ball tunnels 54 and 56 are diametrically opposite from one another but have the same configuration so that only tunnel 54 and the associated ball train 22 are described in detail.

As shown best in FIGS. 1 and 4, tunnel 54 originates in a portal 64 providing a ball pickup in the ramp formed in the mating portions 36 and 46 of the deflector plate 30 and guide plate 44. The tunnel 54 follows the incline of the ramp to lift the balls of the train 22 away from the helical groove 8 of the screw as this groove exits the ball nut 18 to prevent their escape onto adjacent helical groove 10 internal of the ball nut body and without intermixture into ball train 20. From the outer end of the ramp, the tunnel 54 spirals radially outwardly generally following the plane of the guide surfaces 40 of the deflector plate and terminates in a 90° turn 68 opening into the intermediate passage 58. Passage 58 extends longitudinally across the body of the nut into the spiraling ball tunnel 70 in ball return fixture 26 which is like tunnel 54 and which feeds the balls of train 22 back into the end turn of the helical race formed in part by helical groove 8.

As best shown by FIG. 4, the tunnel 70 extends from the terminal end of the intermediate passage 58 and curls in a spiral path around the backside of the screw 6 to a terminal portal 71 corresponding to portal 64 on land 14 adjacent the helical groove 8 for smooth delivery of the circulating balls of train 22 into the helical race for this train. Thus, the balls of train 22 exit at a portal corresponding to portal 64 to feed balls back into the helical race from which they exited at the leftward end of the ball nut body 18. It will be appreciated that on reversal of rotation of the screw 6, the circulation of the ball train 22 will be reversed.

Figure 3:
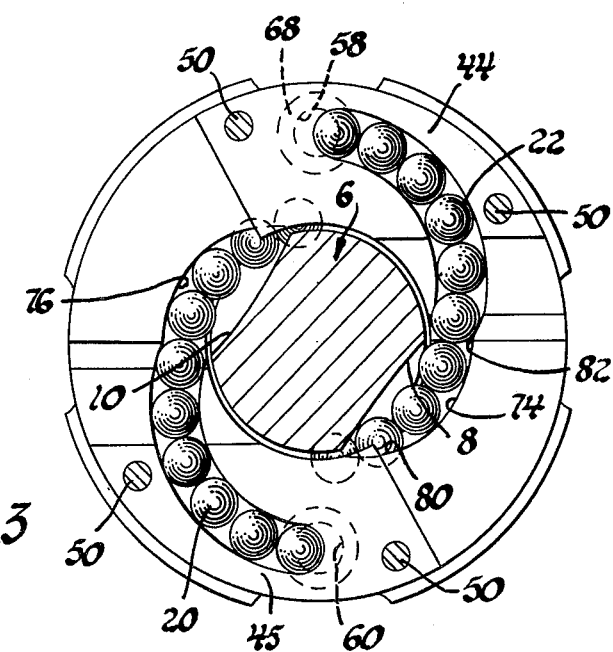
FIG. 3 is a sectional view taken along sight line 3—3 of FIG. 1.

The balls of the two separate trains 20 and 22 exiting into ball return fixture 24 are also respectively delivered smoothly to the lands 12 and 14 of the screw 6 formed in the ball nut body for relative vibration-free operation. As best shown in FIG. 3, the end turns of the two helical races for ball trains 20 and 22 feed into radially disposed guide tracks 74 and 76 formed in the end of the ball nut body 18. The outboard sidewall of tracks 74 and 76 are provided by the inner flat surfaces 33 and 35 of the deflector plate. Having no lead, guide tracks 74 and 76 are non-helical and guide the balls of the trains tangentially along a short path from the helical races onto corresponding lands of the screw 6. In this connection, reference is made to similar ball nut construction of my copending application Ser. No. 835,735 filed Sept. 22, 1977 in which only a single helical lead and ball train can be provided.

The following description of guide track 74 and the associated ball train 22 applies equally to guide track 76 and ball train 20. More particularly, the outer surface of the guide track 74 is radially relieved outwardly from point 80, a point of cam relief to a terminal point 82 which is always above the land 14 of the screw as the ball nut housing moves along the screw. The balls of train 22 being acted upon by centrifugals of predetermined magnitude will be spun tangentially away from the end turn of the helical race and will follow a natural unobstructed path in moving from the point of cam relief to terminal point 82. From terminal point 82, the balls are subsequently fed into the portal 64 formed by the deflector plate and guide plate. The lower half of portal 64 which fits over land 14 does not allow a low speed ball to follow the screw. A high speed ball, however, will travel along the outer surface of the guide track and tunnel without contact of the pickup. From the portal 64 the balls are guided by the ramp away from the helical groove 8 so that they will not intermix with the ball train 20 as would otherwise be the case. As stated above, at the termination of the ramp portion of the ball return fixture, the balls are guided by the tunnel 54 in the outwardly spiraling path to the 90° turn 68 for delivery to the intermediate passage 58. Balls of train 22 exiting from the intermediate passage 58 enter the 90° turn formed in guide plate and the deflector plate of the return fixture. Balls exiting from tunnel 70 are smoothly fed into the start or trailing end turn of the helical race by the radially relieved guide track in the ball nut housing.

As shown and described, the discrete ball return path for ball train 22 active in helical groove 8 is comprised of the ramp and spiral tunnel 54, intermediate passage 24 and the ramp and spiral tunnel 70. This path is in the upper half of the ball nut assembly so that a corresponding discrete ball return path for ball train 20 active in helical groove 10 is provided in the lower half of the ball nut assembly. Since the balls of the separate trains cannot become intermixed because of the ramps and spiral tunnels of the ball return fixtures the trains operate with high efficiency in a relative vibration-free manner making this invention desirable for many uses including uses for highly sensitive X-ray and television equipment.

This invention is not limited to the details of the construction shown and described for purposes of illustrating for other modifications will occur to those skilled in the art.

I claim:
1. An actuator comprising a ball nut, an elongated screw having a pair of helical grooves in the outer surface thereof providing double leads and extending through said nut, said nut and screw forming a pair of separate helical ball races therebetween, said screw and ball nut being operatively connected by first and second separate endless ball trains respectively active in said races so that relative rotation of said screw and nut will produce smooth relative linear movement therebetween, a pair of intermediate ball passages transversing the major longitudinal dimension of said nut, ball return fixture means secured to opposite ends of said nut, each of said fixture means having a ball deflector plate and a cooperating guide plate to provide a pair of discrete cylindrical ball passages therein, each passage having a diameter to facilitate the movement of the balls of said associated train therethrough and each including a ball ramp portion for moving the balls of the associated ball train exiting from the end of the nut in an axial path away from said ball nut and an arcuate track portion communicating with the outer end of said ramp portion for guiding said balls into said intermediate passage to thereby prevent said balls of said separate trains from mixing with one another.

2. An actuator comprising a ball nut, an elongated screw having a pair of helical grooves in the outer surface thereof and extending axially through said nut, said nut and screw forming a pair of helical ball races therebetween, said screw and ball nut being operatively connected by first and second separate endless ball trains active in said races so that relative rotation of said screw and nut will produce smooth relative linear movement therebetween, a pair of intermediate ball passages transversing the major longitudinal dimension of said nut, ball return fixture means secured to opposite ends of said nut, each said ball return fixture means having a pair of discrete cylindrical ball tunnels formed therein which have a diameter to accommodate the balls of said separate train and which smoothly feeds the balls of said separate trains into an associated one of said intermediate ball passages, each of said tunnels having a ramp portion adjacent to the end turn of said helical ball race, each ramp being inclined away from the adjacent helical groove to guide said balls of an associate ball train axially from the end of said nut, each of said tunnels further comprising an arcuate portion extending from the outer extremity of said ramp portion into an associated one of said intermediate ball passages to thereby prevent said balls of said separate trains from intermixing with one another.

* * * * *